United States Patent
Attwater et al.

[11] Patent Number: 5,940,793
[45] Date of Patent: Aug. 17, 1999

[54] VOICE-OPERATED SERVICES

[75] Inventors: David J. Attwater; Steven J. Whittaker; Francis J. Scahill; Alison D. Simons, all of Ipswich, United Kingdom

[73] Assignee: British Telecommunications public limited company, London, United Kingdom

[21] Appl. No.: 08/817,673

[22] PCT Filed: Oct. 25, 1995

[86] PCT No.: PCT/GB96/02524

§ 371 Date: Apr. 21, 1997

§ 102(e) Date: Apr. 21, 1997

[87] PCT Pub. No.: WO96/13030

PCT Pub. Date: May 2, 1996

[30] Foreign Application Priority Data

Oct. 25, 1994 [EP] European Pat. Off. .............. 94307843

[51] Int. Cl.⁶ ................................ G10L 3/02; G10L 9/00; G10L 3/00
[52] U.S. Cl. ............................................. 704/231; 704/275
[58] Field of Search ...................................... 704/231, 275

[56] References Cited

U.S. PATENT DOCUMENTS

| | | | |
|---|---|---|---|
| 4,947,438 | 8/1990 | Paeseler | 704/257 |
| 5,202,952 | 4/1993 | Gillick et al. . | |
| 5,488,652 | 1/1996 | Bielby | 704/231 |

FOREIGN PATENT DOCUMENTS

| | | |
|---|---|---|
| 0269233 A1 | 6/1988 | European Pat. Off. . |
| 0299572 | 1/1989 | European Pat. Off. . |
| 0625758 A1 | 11/1994 | European Pat. Off. . |
| 2165969 | 4/1986 | United Kingdom . |
| WO 96/13030 | 5/1996 | WIPO . |

OTHER PUBLICATIONS

Young, "Use of Dialogue, Pragmatics and Semantics to Enhance Speech Recognition", 8308 Speech Communication 9(1990) Dec., Nos. 5/6 Amsterdam, Netherlands, pp. 551–564.

Yamada et al., "A Spoken Dialogue System with Active/Non–Active Word Control for CD–ROM Information Retrieval", Speech Communication, 15 (1994) 355–365.

*Primary Examiner*—David R. Hudspeth
*Assistant Examiner*—Robert Louis Sax
*Attorney, Agent, or Firm*—Nixon & Vanderhye P.C.

[57] ABSTRACT

A method and apparatus accesses a database where entries are linked to at least two sets of patterns. One or more patterns of a first set of patterns are recognized within a received signal. The recognized patterns are used to identify entries and compile a list of patterns in a second set of patterns to which those entries are also linked. The list is then used to recognize a second received signal. The received signals may, for example, be voice signals or signals indicating the origin or destination of the received signals.

37 Claims, 6 Drawing Sheets

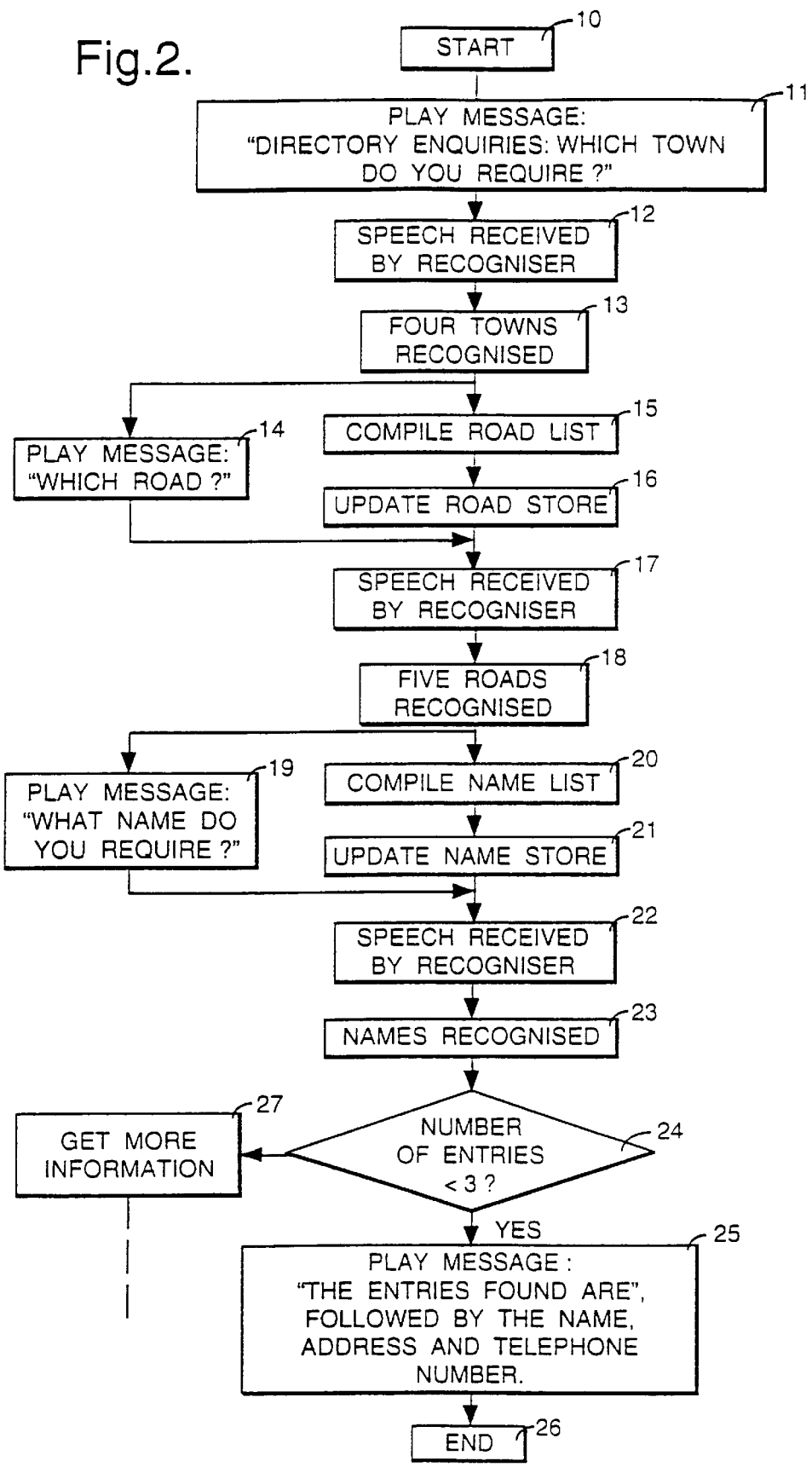

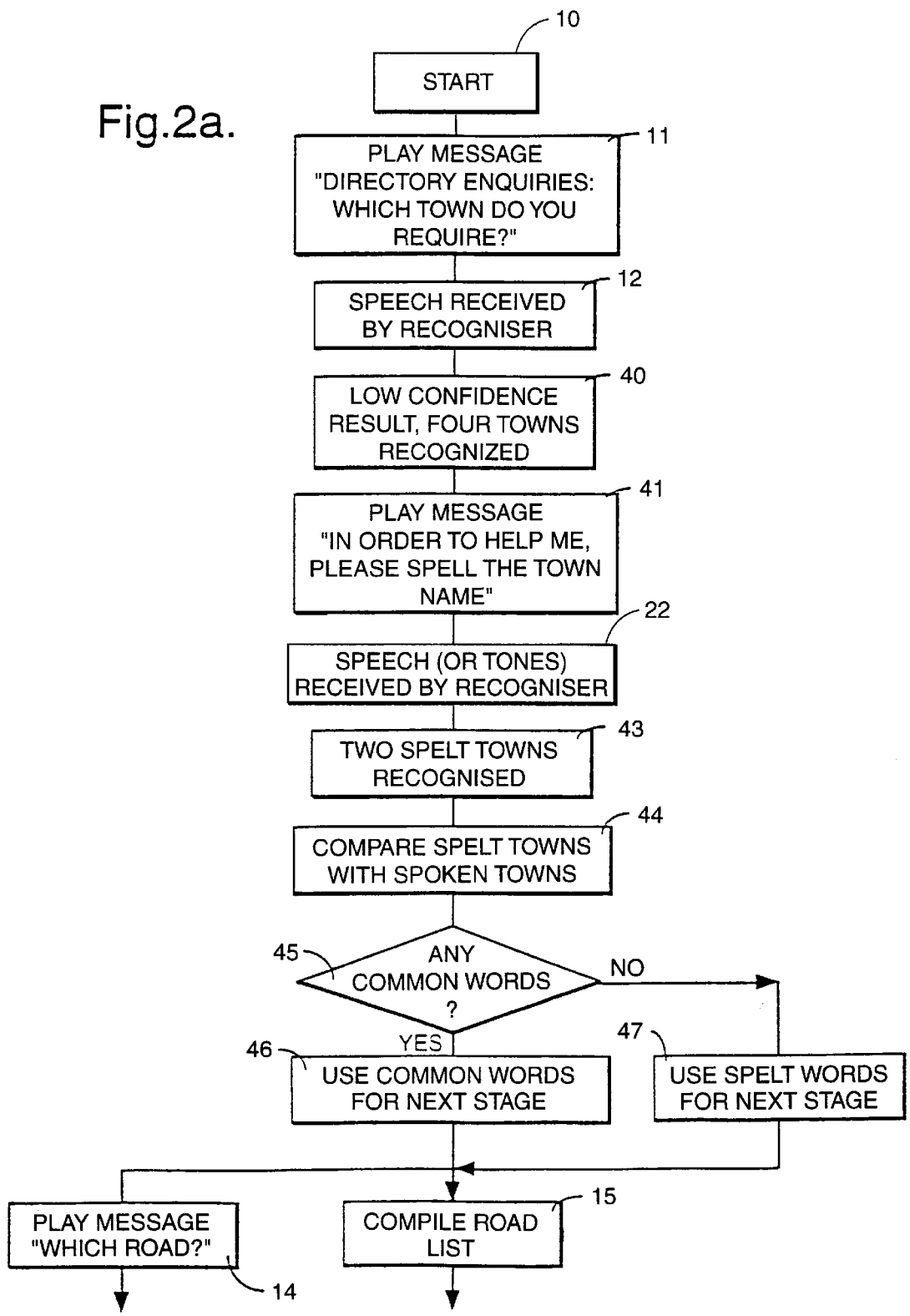

VOICE-OPERATED SERVICES

BACKGROUND OF THE INVENTION

1. Field of the Invention

The present invention is concerned with automated voice-interactive services employing speech recognition, particularly, though not exclusively, for use over a telephone network.

2. Related Art

A typical application is an enquiry service where a user is asked a number of questions in order to elicit replies which, after recognition by a speech recogniser, permit access to one or more desired entries in an information bank. An example of this is a directory enquiry system in which a user, requiring the telephone number of a telephone subscriber, is asked to give the town name and road name of the subscriber's address, and the subscriber's surname.

SUMMARY OF THE INVENTION

According to one aspect of the present invention there is provided a speech recognition apparatus comprising a store of data containing entries to be identified and information defining for each entry a connection with a word of a first set of words and a connection with a word of a second set of words; speech recognition means; and control means operable:

(a) so to control the speech recognition means as to identify by reference to recognition information for the first set of words as many words of the first set as meet a predetermined criterion of similarity to first received voice signals;

(b) upon such identification, to compile a list of all words of the second set which are defined as connected with entries defined as connected also with the identified word(s) of the first set; and (c) so to control the speech recognition means as to identify by reference to recognition information for the second set of words one or more words of the list which resemble(s) second received voice signals.

Preferably the speech recognition means is operable upon receipt of the first voice signal to generate for each identified word a measure of similarity with the first voice signal, and the control means is operable to generate for each word of the list a measure obtained from the measure(s) for the relevant word(s) of the first set (i.e those identified words of the first set with which a word of the list has a common entry). The speech recognition means is then operable upon receipt of the second voice signal to perform the identification of one or more words of the list in accordance with a recognition process weighted in dependence on the measures generated for the words of the list.

The apparatus may also include a store containing recognition data for all words of the second set and the control means is operable following the compilation of the list and before recognition of the word(s) of the list to mark in the recognition data store those items of data therein which correspond to the words not in the list or those which correspond to words which are in the list, whereby the recognition means may ignore all words so marked or, respectively, not marked.

Alternatively the recognition data may be generated dynamically either before recognition or during recognition, the control means being operable following the compilation of the list to generate recognition data for each word of the list. Methods for dynamically generating recognition data fall outside the scope of the present invention but will be clear to those skilled in this art.

Preferably the control means is operable to select for output that entry or entries defined as connected both with an identified word(s) of the first set and an identified word of the second set.

The store of data may also contain information defining for each entry a connection with a word of a third set of words, the control means being operable:

(d) to compile a list of all words of the third set which are defined as connected with entries each of which is also defined as connected both with an identified word of the first set and an identified word of the second set; and (e) so to control the speech recognition means as to identify by reference to stored recognition information for the third set of words one or more words of the list which resemble(s) third received voice signals.

Furthermore, means may be included to store at least one of the received voice signals, the apparatus being arranged to perform an additional recognition process in which the control means is operable:

(a) so to control the speech recognition means as to identify by reference to stored recognition information for the second set of words a plurality of words of the second set which meet a predetermined criterion of similarity to the second received voice signals;

(b) to compile an additional list of all words of the first set which are defined as connected with entries defined as connected also with the identified words of the second set; and (c) so to control the speech recognition means as to identify by reference to stored recognition information for the first set of words one or more words of the said additional list which resemble(s) the first received voice signals.

Preferably the apparatus includes means to recognise a failure condition and to initiate the said additional recognition process only in the event of such failure being recognised.

The apparatus may comprise a telephone line connection; a speech recogniser for recognising spoken words received via the telephone line connection, by reference to recognition data representing a set of possible utterances; and means responsive to receipt via the telephone line connection of signals indicating the origin or destination of a telephone call to access stored information identifying a subset of the set of utterances and to restrict the recogniser operation to that subset.

According to a further aspect of the invention, a telephone apparatus comprises a telephone line connection; a speech recogniser for determining or verifying the identity of the speaker of spoken words received via the telephone line connection, by reference to recognition data corresponding to a set of possible speakers; and means responsive to receipt via the telephone line connection of signals indicating the origin or destination of a telephone call to access stored information identifying a subset of the set of speakers and to restrict the recogniser operation to that subset.

According to a yet further aspect of the invention, a telephone information apparatus comprises a telephone line connection; a speech recogniser for recognising spoken words received via the telephone line connection, by reference to one of a plurality of stored sets of recognition data; and means responsive to receipt via the telephone line connection of signals indicating the origin or destination of a telephone call to access stored information identifying one of the sets of recognition data and to supply this set to the recogniser.

The stored sets may, for example, correspond to different languages or regional accents or, say, two of the sets may correspond to the characteristics of different types of telephone apparatus, for instance the characteristics of a mobile telephone channel.

According to a further aspect of the invention a recognition apparatus comprises a store defining a first set of patterns;

a store defining a second set of patterns;

a store containing entries to be identified;

a store containing information relating each entry to a pattern of the first set and to a pattern of the second set;

recognition means operable upon receipt of a first input pattern signal to identify as many patterns of the first set as meet a predetermined recognition criterion;

means to generate a list of all patterns of the second set which are related to an entry to which an identified pattern(s) of the first set is also related; and recognition means operable upon receipt of a second input pattern signal to identify one or more patterns of the list.

The patterns may represent speech and the recognition means be a speech recogniser.

In accordance with the invention, a speech recognition apparatus comprises (i) a store of data containing entries to be identified and information defining for each entry a connection with a signal of a first set of signals and a connection with a word of a second set of words;

(ii) means for identifying a received signal as corresponding to as many signals of the first set as meet a predetermined criterion;

(iii) control means operable to compile a list of all words of the second set which are defined as connected with entries defined as connected also with the identified signal(s) of the first set; and (iv) speech recognition means operable to identify by reference to stored recognition information for the second set of words one or more words of the list which resemble(s) received voice signals.

Preferably the first set of signals are voice signals representing spelled versions of the words of the second set or initial portions thereof and the identifying means are formed by the speech recognition means operating by reference to stored recognition information for the said spelled voice signals. Alternatively the first set of signals may be signals consisting of tones and the identifying means is a tone recogniser. The first set of signals may indicate the origin or destination of the receive signal.

In accordance with a further aspect of the invention, a method of identifying entries in a store of data by reference to stored information defining connections between entries and words, comprises (a) identifying one or more of the said words as present in received voice signals;

(b) compiling a list of those of the said words defined as connected with entries defined as connected also with the identified word(s);

(c) identifying one or more of the words of the list as present in the received voice signals.

In a further aspect of the invention a speech recognition apparatus comprises a) a store of data containing entries to be identified and information defining for each entry a connection with at least two words;

b) a speech recognition means able to identify by reference to stored recognition information for a defined set of words at least one word or word sequence which meets some predefined criterion of similarity to a received voice signal;

(c) a control means operable:

i) to compile a list of words which are defined as connected with entries defined as connected with a word previously identified by the speech recognition means; and ii) so to control the speech recognition means as to identify by reference to stored recognition information for the compiled list one or more words or word sequences which resemble a further received voice signal.

A method of speech recognition by reference to a stored set of words to be recognised, according to the invention comprises (a) receiving a speech signal;

(b) storing the speech signal;

(c) receiving a second signal;

(d) compiling a list of words, being a subset of the set of words, as a function of the second signal;

(e) applying to the stored speech signal a speech recognition process so as to identify by reference to the list one or more words of the subset.

The second signal may also be a speech signal, and the second signal may be recognised by reference to recognition data representing the letters of the alphabet, either individually or as sequences. Alternatively the second signal may be a signal consisting of tones generated by a keypad.

According to another aspect of the invention, a method of speech recognition comprises (a) receiving a speech signal;

(b) storing the speech signal;

(c) performing a recognition operation on the speech signal or some other signal;

(d) in the event of the recognition operation failing to meet a predetermined criterion of reliability, retrieving the stored speech signal and performing a recognition operation thereon.

BRIEF DESCRIPTION OF THE DRAWINGS

Some embodiments of the invention will now be described, by way of example, with reference to the accompanying drawings, in which:

FIG. 2 is a flow chart illustrating the operation of the directory enquiry system of FIG. 1;

FIG. 2a is a flow chart illustrating a second embodiment of operation of the directory enquiry system of FIG. 1;

DETAILED DESCRIPTION OF EXEMPLARY EMBODIMENTS

Figure 1:
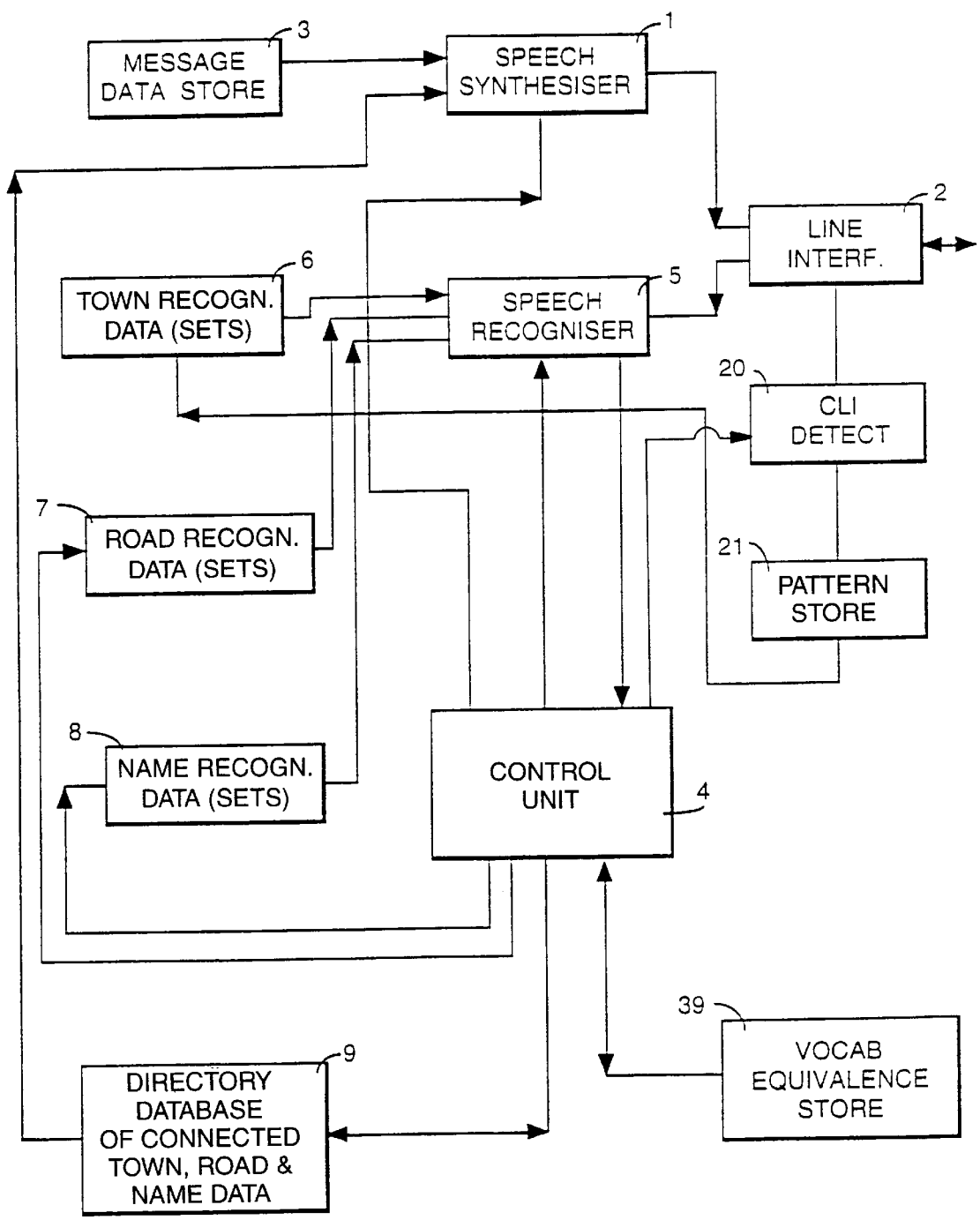
FIG. 1 shows schematically the architecture of a directory enquiry system.

The embodiment of the invention now to be described addresses the same directory enquiry task as was discussed in the introduction. It operates by firstly asking an enquirer for a town name and, using a speech recogniser, identifies as "possible candidates" two or more possible town names. It then asks the enquirer for a road name and recognition of the reply to this question then proceeds by reference to stored data pertaining to all road names which exist in any of the candidate towns. Similarly, the surname is asked for, and a recognition stage then employs recognition data for all candidate road names in candidate towns. The number of candidates retained at each stage can be fixed, or (preferably) all candidates meeting a defined acceptance criterion—e.g. having a recognition score above a defined threshold—may be retained.

Before describing the process in more detail, the architecture of a directory enquiry system will be described with reference to FIG. 1. A speech synthesiser 1 is provided for providing announcements to a user via a telephone line interface 2, by reference to stored, fixed messages in a message data store 3, or from variable information supplied to it by a main control unit 4. Incoming speech signals from the telephone line interface 2 are conducted to a speech recogniser 5 which is able to recognise spoken words by reference to, respectively, town name, road name or surname recognition data in recognition data stores of 6, 7, 8.

A main directory database 9 contains, for each telephone subscriber in the area covered by the directory enquiry service, an entry containing the name, address and telephone number of that subscriber, in text form. The town name recognition data store 6 contains, in text form, the names of all the towns included in the directory database 9, along with stored data to enable the speech recogniser 5 to recognise those town names in the speech signal received from the telephone line interface 2. In principle, any type of speech recogniser may be used, but for the purposes of the present description it is assumed that the recogniser 5 operates by recognising distinct phonemes in the input speech, which are decoded by reference to stored data in the store 6 representing a decoding tree structure constructed in advance from phonetic translations of the town names stored in the store 6, decoded by means of a Viterbi algorithm. The stores 7, 8 for road name recognition data and surname recognition data are organised in the same manner. Although, for example, the surname recognition data store 8 contains data for all the surnames included in the directory database 9, it is configurable by the control unit 4 to limit the recognition process to only a subset of the names, typically by flagging the relevant parts of the recognition data so that the "recognition tree" is restricted to recognising only those names within a desired subset of the names.

This enables the 'recognition tree' to be built before the call commences and then manipulated during the call. By restricting the active subset of the tree, computational resources can be concentrated on those words which are most likely to be spoken. This reduces the chances that an error will occur in the recognition process, in those cases where one of these most likely words has been spoken.

Each entry in the town data store 6 contains, as mentioned above, text corresponding to each of the town names appearing in the database 9, to act as a label to link the entry in the store 6 to entries in the database 9 (though other kinds of label may be used if preferred). If desired, the store 6 may contain an entry for every town name that the user might use to refer to geographical locations covered by the database, whether or not all these names are actually present in the database. Noting that some town names are not unique (there are four towns in the UK called Southend), and that some town names carry the same significance (e.g. Hammersmith, which is a district of London, means the same as London as far as entries in that district are concerned), an equivalence data store 39 is also provided, containing such equivalents, which can be consulted following each recognition of a town name, to return additional possibilities to the set of town names considered to be recognised. For example if "Hammersmith" is recognised, London is added to the set; if "Southend" is recognised, then Southend-on-Sea, Southend (Campbeltown), Southend (Swansea) and Southend (Reading) are added.

The equivalence data store 39 could, if desired, contain similar information for roads and surnames, or first names if these are used; for example Dave and David are considered to represent the same name.

As an alternative to this structure, the vocabulary equivalence data store 39 may act as a translation between labels used in the name stores 6, 7, 8 and the labels used in the database (whether or not the labels are names in text form).

The use of text to define the basic vocabulary of the speech recogniser requires that the recogniser can relate one or more textual labels to a given pronunciation. That is to say in the case of a 'recognition tree', each leaf in the tree may have one or more textual labels attached to it. If the restriction of the desired vocabulary of a recogniser is also defined as a textual list, then the recogniser should preferably return only textual labels in that list, not labels associated with a pronunciation associated with a label in the list that are not themselves in the list.

The system operation is illustrated by means of the flowchart set out in FIG. 2. The process starts (10) upon receipt of an incoming telephone call signalled to the control unit 4 by the telephone line interface 2; the control unit responds by instructing the speech synthesiser 1 to play (11) a message stored in the message store 3 requesting the caller to give the name of the required town. The caller's response is received (12) by the recogniser. The recogniser 3 then performs its recognition process (13) with reference to the data stored in the store 6 and communicates to the control unit 4 the name of the town which most clearly resembles the received reply or (more preferably) the names of all those towns which meet a prescribed threshold of similarity with the received reply. We suppose (for the sake of this example) that four town names meet this criterion. The control unit 4 responds by instructing the speech synthesiser to play (14) a further message from the message data store 3 and meanwhile accesses (15) the directory database 9 to compile a list of all road names which are to be found in any of the geographical locations corresponding to those four town names and also any additional location entries obtained by accessing the equivalence data store 39. It then uses (16) this information to update the road name recognition data store 7 so that the recogniser 3 is able to recognise only the road names in that list.

The next stage is that a further response, relating to the road name, is received (17) from the caller and is processed by the recogniser 3 utilising the data store 7; suppose that five road names meet the recognition criterion. The control unit 4 then instructs the playing (19) of a further message asking for the name of the desired telephone subscriber and meanwhile (20) retrieves from the database 9 a list of the surnames of all subscribers residing in roads having any of the five road names in any of the four geographical locations (and any equivalents), and updating the surname recognition data store 8 in a similar manner as described above for the road name recognition data store. Once the user's response is received (22) by the recogniser, the surname may be recognised (23) by reference to the data in the surname recognition data store.

It may of course be that more than one surname meets the recognition criterion; in any event, the database 9 may contain more than one entry for the same name in the same road in the same town. Therefore at step 24 the number of directory entries which have one of the recognised surnames and one of the recognised road names and one of the recognised town names is tested. If the number is manageable, for example if it is three or fewer, the control means instructs (25) the speech synthesiser to play an announcement from the message data store 3, followed by recitation of the name, address and telephone number of each entry, generated by the speech synthesiser 1 using text-to-speech synthesis, and the process is complete (26). If, on the other hand, the number of entries is excessive then further steps 27, to be discussed further below, will be necessary in order to meet the caller's enquiry.

It will be seen that the process described will have a lower failure rate than a system which chooses only a single candidate town, road or surname at each stage of the recognition process, since by retaining second and further choice candidates the possibility of error due to mis-recognition is reduced though there is increased risk of recognition error due to the larger vocabulary. A penalty for this increased reliability is of course increased computation time, but by ensuring that the road name and surname recognition processes are conducted over only a limited number of the total number of road names and surnames in the database, the computation can be kept to manageable proportions.

Moreover, compared with a system in which a second-stage recognition is unconstrained by the results of a previous recognition (e.g. one where the 'road' recognition processes is not limited to roads in town proposed system would, when using recognisers (such as those using Hidden Markov Models) which internally "prune" intermediate results, be less liable to prune out the desired candidate in favour of other candidate roads from unwanted towns.

It will be seen too, that the number of possible lists will, in most applications, be so large as to prohibit their preparation in advance, and hence the construction of the list is performed as required. Where the recogniser is of the type (e.g. recognisers using Hidden Markov models) which require setting up for a particular vocabulary, there are two options for updating the relevant store to limit the recogniser's operation to words in the list. One is to start with a fully set-up recogniser, and disable all the words not in the list; the other is to clear the relevant recognition data store and set it up afresh (either completely, or by adding words to a permanent basic set). It should be noted that some recognisers do not store recognition data for all words which may be recognised. These recognisers generally have a store of textual information relating to the words that may be recognised but do not prestore data to enable the speech recogniser to recognise words in a received signal. In such so-called "dynamic recognisers" the recognition data is generated either immediately before or during recognition.

The first option requires large data stores but is relatively inexpensive computationally for any list size. The second option is generally computationally expensive for large lists but requires much smaller data stores and is useful when there are frequent data changes. Generally the first option would be preferred, with the second option being invoked in the case of a short list, or where the data change frequently.

The criterion for limiting the number of recognition 'hits' at steps 13, 18 or 23 may be that all candidates are retained which meet some similarity criterion, though other criteria such as retaining always a fixed number of candidates may be chosen if preferred. It may be, in the earlier recognition stages, that the computational load and effect on recognition performances of retaining a large town (say) with a low score is not considered to be justified, whereas retaining a smaller town with the same score might be. In this case the scores of a recognised word may be weighted by factors dependent on the number of entries referencing that word, in order to achieve such differential selection.

In the examples discussed above, a list of words (such as road names) to be recognised is generated based on the results of an earlier recognition of a word (the town name). However it is not necessary that the unit in the earlier recognition step or in the list be single words; they could equally well be sequences of words. One possibility is a sequence of the names of the letters of the alphabet, for example a list of words for a town name recognition step may be prepared from an earlier recognition of the answer to the question "please spell the first four letters of the town name." If recording facilities are provided (as discussed further below) it is not essential that the order of recognition be the same as the order of receipt of the replies (it being more natural to ask for the spoken word first, followed by the spelled version, though it is preferred to process them in the opposite sequence).

It is assumed in the above description that the recognisers always produce a result—i.e. that the town (etc) name or names which give the nearest match(es) to the received response are deemed to have been recognised. It would of course be possible to permit output of a "fail" message in the event that a reasonably accurate match was not found. In this case further action may be desired. This could simply be switching the call to a manual operator. Alternatively further information may be processed automatically as shown in FIG. 2a. In this example a low confidence match 40 has still resulted in four possible candidate towns. Because of the questionable accuracy of this match a further message is played to the caller asking for an additional reply which may be checked against existing recognition results. In the example, a spelling of the town name is requested 41 allowing all permissible spellings of all town names in the recognition vocabulary. Following a confident recognition 43 two spellings are recognised. These two town names may be considered more confident than the four spoken town names recognised previously, but a comparison 44 of both lists may reveal one or more common town names in both lists. If this is so 46 then a very high confidence of success may be inferred for these common town names and the enquiry may proceed, for example, in the same manner as FIG. 2 using-these common towns to prepare the road name recognition 15. If no common town names are found then the two spelt towns may be retained 47 for use in the next stage which may be preparing the road name recogniser 15 with the two town names as shown in the diagram, or may be a different processing step not shown in FIG. 2a, for example a confirmation of the more confident of the two town names with the user in order to increase the system confidence before a subsequent request for information is made.

It is not necessary that the response to be recognised be discrete responses to discrete questions. They could be words extracted by a recogniser from a continuous sentence, for systems which work in this way.

Another situation in which it may be desired to vary the scope of the speech recogniser's search is where it can be modified on the basis not of previous recogniser results but of some external information relevant to the enquiry. In a directory enquiry system this may be a signal indicating the origin of a telephone call, such as the calling line identity (CLI) or a signal identifying the originating exchange. In a simple implementation this may be used to restrict town name recognition to those town names located in the same or an adjacent exchange area to that of the caller. In a more sophisticated system this identification of the calling line or exchange may be used to access stored information compiled to indicate the enquiry patterns of the subscriber in question or of subscribers in that area (as the case may be).

For example, a sample of directory enquiries in a particular area might show that 40% of such calls were for numbers in the same exchange area and 20% for immediately adjacent areas. Separate statistical patterns might be compiled for business or residential lines, or for different times of day, or other observed trends such as global usage statistics of a service that are not related to the nature or location of the originating line.

The effect of this approach can be to improve the system reliability for common enquiries at the expense of uncommon ones. Such a system thus aims to automate the most common or straightforward enquiries, with other calls being dealt with in an alternative manner, for example being routed to a human operator.

Figure 3:
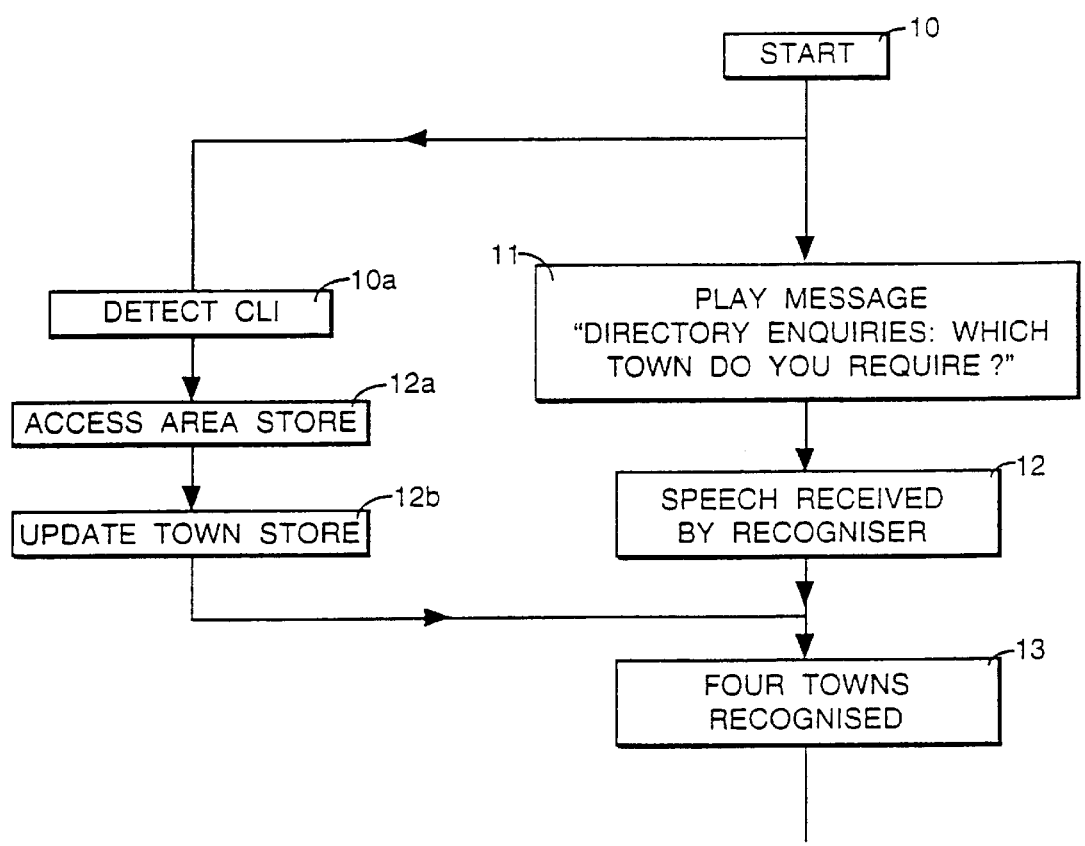
FIG. 3 is a flow chart illustrating the use of CLI in the operation of the directory enquiry system of FIG. 1.

As an example, FIG. 1 additionally shows a CLI detector 20, (used here only to indicate the originating exchange) which is used to select from a store 21 a list of likely towns for enquiries from that exchange, to be used by the control unit 4 to truncate the "town name" recognition, as indicated in the flowchart of FIG. 3, where the calling line indicator signal is detected at step 10a, and selects (12a) a list of town names from the store 21 which is then used (12b) to update the town name recognition store 6 prior to the town name recognition step 13. The remainder of the process is not shown as it is the same as that given in FIG. 2.

An extension of this approach is to improve the system reliability and speed for common enquiries, whilst using additional information to enable the less common enquiries to succeed. Thus the less common enquiries are still able to succeed but require more effort and information to be supplied by the caller than the common enquiries require.

Figure 3A:
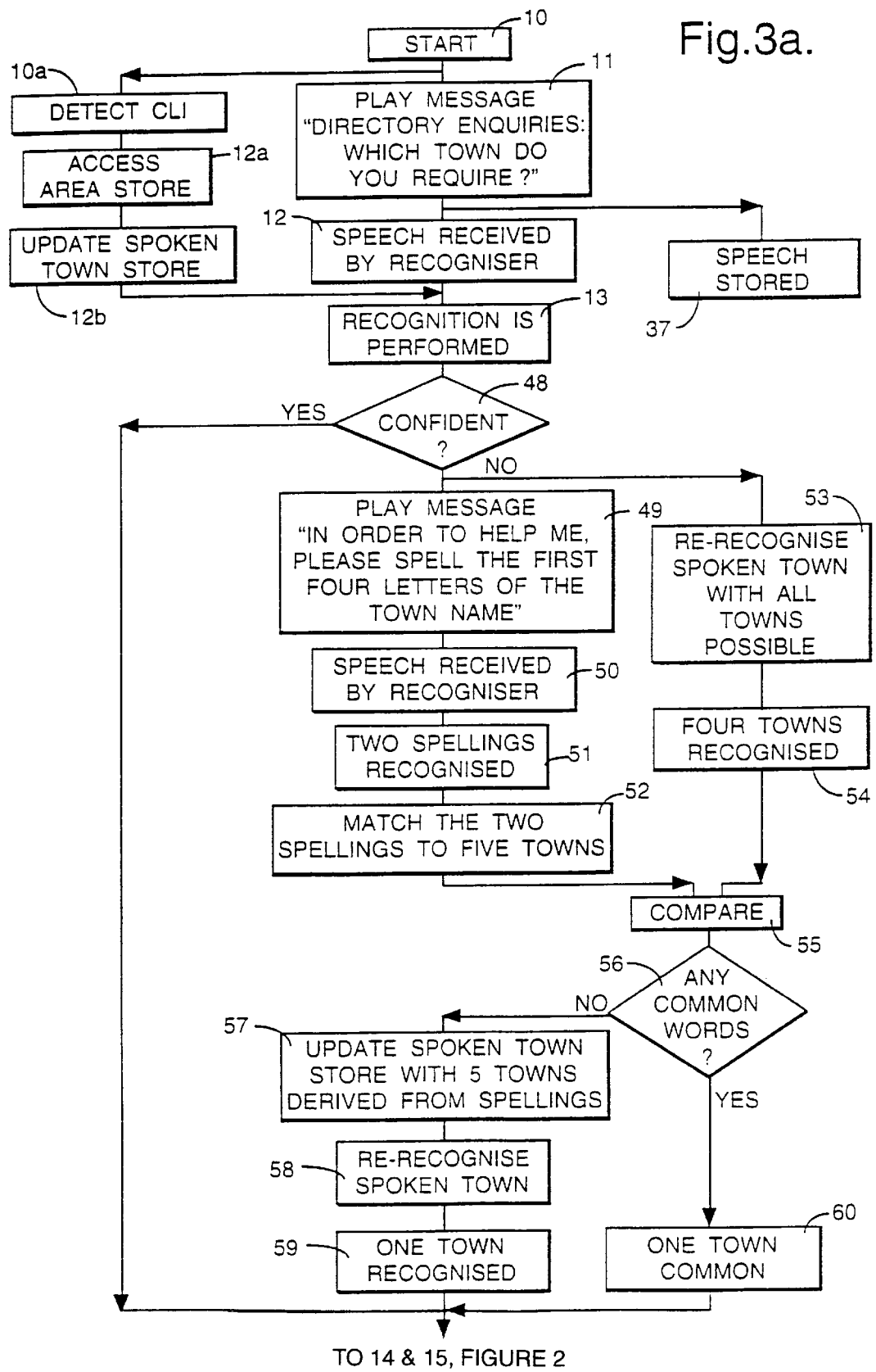
FIG. 3a includes a further information gathering step for use in the operation of the directory enquiry system of FIG. 1.

As an example consider FIG. 3a. The spoken town name is asked for 11, and the CLI is detected 10a. As in FIG. 3, the CLI is then related to town names commonly requested by callers with that CLI identity 12a. These town names update the spoken town name store 12b. This process is identical to that shown in FIG. 3 so far. Additionally, as the speech is gathered for recognition it is stored for later re-recognition 37. The restricted town name set used in the recognition 13 will typically be a small vocabulary covering a significant proportion of enquiries. If a word within this vocabulary is spoken and confidently recognised 48 then the enquiry may immediately use this recognised town or towns to prepare the road name store and continue as described in FIG. 2.

If the word is recognised as being outside of the vocabulary or of poor confidence then an additional message 49 is played to ask the caller for more information, which in this case is the first four letters of the town name. Simultaneously, an additional re-recognition of the spoken town name 53 may be performed which can recognise any of the possible town names in the directory. In this example we assume that four town names are recognised 54. At the same time, the caller may be spelling in the first four letters of the town name 50 and two spellings 51 have been confidently recognised. These two spellings are then expanded to the full town names which match them 52. It may be necessary to anticipate common spelling errors, additional or missing letters, abbreviations, and punctuation in the preparation of the spelling vocabulary, and the subsequent matching of the spelt recognition results to the full town names. Assume in this example that five town names match the two spellings.

A comparison 55 identical in purpose to that described in FIG. 2a (44) may then be performed between the five town names derived from the two spellings and the four re-recognised town names. If common words are found in these two sets, (only one common word is assumed in this example,) then this town name may confidently be assumed to be the correct one and the road name recognition data store 7 may be prepared from it and the enquiry proceeds as shown in FIG. 2.

In other cases, the spoken recognition 53 will be in error and no common words will be found. Alternatively, the recognition of the town name 53, and its subsequent comparison 55, may be considered optional and omitted. In both of these instances the spoken town store will be updated 57 with the five towns derived from the two spellings 52 and the spoken town name re-recognised again 58. In the example, it is assumed that a single confident town name was recognised. This town name may be used to configure the road name recognition data store 7 and the enquiry proceeds as shown in FIG. 2.

The deliberate restriction of a vocabulary to only the very most likely words as described above need not necessarily depend on CLI. The preparation of the road name vocabulary based on the recognised town names is itself an example of this, and the approach of asking for additional information, as shown in FIG. 3a, may be used if any such restricted recognition results are not confident. Global observed or postulated behaviour can also be used to restrict a vocabulary (e.g. the town store) in a similar way to CLI derived information, as can signals indicating the destination of a call. For example, callers may be encouraged to dial different access numbers for particular information. On receipt of a call by a common apparatus for all the information, the dialed number determines the subset of the vocabulary to be used in subsequent operation of the apparatus. The operation of the apparatus would then continue similarly as described above with relation to CLI.

Additionally, the re-recognition of a gathered word that has been constrained by additional information such as the four letter spelling in FIG. 3a could be based on any kind of information, for example DTMF entry via the telephone keypad, or a yes,no response to a question restricting the scope of the search (e.g. "Please say yes or no: does the person live in a city?"). This additional information could even be derived from the CLI using a different area store 21 based on different assumptions to the previously used one.

In the above described embodiment, no account is taken of the relative probability of recognition, for example if the town recognition step 13 recognises town names Norwich and Harwich, then when, at road recognition step 18, the recogniser has to evaluate the possibility that the caller said "Wright Street" (which we suppose to be in Norwich) or "Rye Street" (in Harwich), no account is taken of the fact that the spoken town bore a closer resemblance to "Norwich" than it did to "Harwich". If desired however, the recogniser may be arranged to produce (in known manner) figures or "scores" indicating the relative similarity of each of the candidates identified by the recogniser to the original utterance and hence the supposed probability of it being the correct one. These scores may then be retained whilst a search is made in the directory database to derive a list of the vocabulary items of the next desired vocabulary that are related to the recognised words. These new vocabulary items may then be given the scores that the corresponding matching word attained. In the case where a word came from a match with more than one recognised word of the previous vocabulary, the maximum score of the two may be selected for example. These scores may then be fed as a priori probabilities to the next recognition stage to bias the selection. This may be implemented in the process depicted in FIG. 2 as follows.

Step 13. The recogniser produces for each town, a score—e.g.

Harwich 40%

Norwich 25%

Nantwich 20%

Northwich 15%

Step 15. When the road list is compiled the appropriate score is appended to the road name, e.g.

Wright Street 25%

Rye Street 40%

North Street (assumed to exist in both Norwich and Nantwich) 25% and stored in the store 7.

Step 18. When the recogniser comes to recognise the road name, it may pre-weight the recognition network (for example in the case of Hidden Markov Models) with the scores from store 7. It then recognises the supplied word, with the resulting effect that these weights make the more likely words less likely to be prematurely pruned out. Alternatively, the recogniser may recognise the utterance, and adjust its resulting scores after recognition according to the contents of store 7. This second option provides no benefit to the pattern matching process, but both options propagate the relative likelihood of an entry finally being selected from vocabulary to vocabulary. For example, considering the post-weighted option, if the recogniser would have assigned the scores of 60%, 30% and 10% to Wright Street, Rye Street and North Street respectively then the weighted scores would be:

Wright Street (Norwich) 25%×60%=15%

Rye Street (Harwich) 40%×30%=12%

North Street (Norwich and Nantwich) 25%×10%=2.5%

Similar modification would of course occur for the steps 20, 21, 23. This is just one example of a scheme for score propagation.

The possibility of switching to a manual operator in the event of a "failure" condition has already been mentioned. Alternatively a user could simply be asked to repeat the action that has not been recognised. However, further automated steps may be taken under failure conditions.

A failure condition can be identified by noting low recogniser output "scores", or of excessive numbers of recognised words all having similar scores (whether by reference to local scores or to weighted scores) or by comparing the scores with those produced by a recogniser comparing the speech to out-of-vocabulary models. Such a failure condition may arise in an unconstrained search like that of the town name recognition of step 13 in FIG. 2. In this case it may be that better results might be obtained by performing (for example) the road name recognition step first (unconstrained) and compiling a list of all town names containing the roads found, to constrain a subsequent town name recognition step. Or it may arise in a constrained search such as that of step 13 in FIG. 3 or steps 18 and 23 in FIG. 2, where perhaps the constraint has removed the correct candidate from the recognition set; in this case removing the constraint—or applying a different one—may improve matters.

Thus one possible approach is to make provision for recording the caller's responses, and in the event of failure, reprocessing them using the steps set out in FIG. 2 (except the "play message" steps 11, 14, 19) but with the original sequence town name/road name/surname modified. There are of course six permutations of these. One could choose that one (or more) of these which experience shows to be the most likely to produce an improvement. The result of such a reprocessing could be used alone, or could be combined with the previous result, choosing for output those entries identified by both processes.

Another possibility is to perform an additional search omitting one stage, and comparing the results as for the 'spelled input' case.

Figure 4:
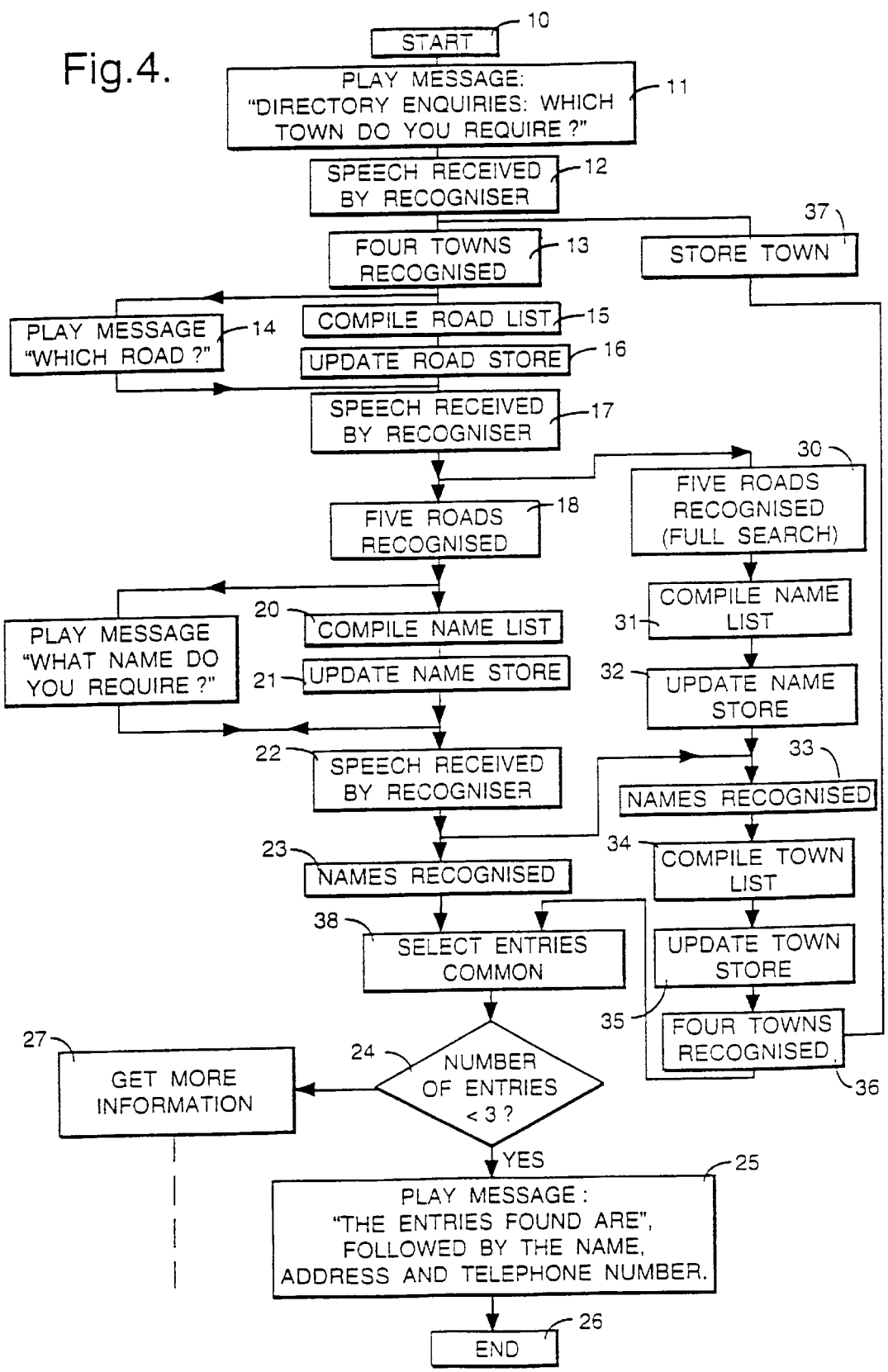
FIG. 4 is a flow chart illustrating a further mode of operation of the directory enquiry system of FIG. 1.

If desired, processing using two (or more) such sequences could be performed routinely (rather than only under failure conditions); to reduce delays an additional sequence might commence before completion of the first; for example (in FIG. 4) an additional, unconstrained "road name" search 30 could be performed (without recording the road name) during the "which surname" announcement. From this, a list of surnames is compiled (31) and the surname store updated (32). Once the surnames from the list have been recognised (33) a town name list may be compiled (34) and the town name store updated (35). Then at step 36 the spoken town name, previously stored at step 37 may be recognised. The results of the two recognition processes may then be compiled, suitably by selecting (38) those entries which are identified by both processes. Alternatively, if no common entries are found, the entries found by one or the other or both of the processes may be used. The remaining steps shown in FIG. 4 are identical to those in FIG. 2.

The technique of storing an utterance and using it in a restricted-vocabulary recognition process following recognition of a later utterance has been described as an option to be used alongside sequential processing, as a cross-check or to provide additional recognition results to be used in the case of difficulty. However, it may be used alone, for example in circumstances where one chooses to have the questions asked in a sequence which seem natural to the user, so as to improve speed and reliability of response, but to process the answers in a sequence which is more suited to the nature of the data. For example in FIG. 4, the right hand branch only could be used (but with steps 14, 17, 19 and 22 retained to feed it)—i.e. omit steps 15, 16, 18, 20, 21, 23, 38.

The use of CLI to modify the expectations of a speech service need not be restricted to the modification of expected vocabulary items as already described. Enquiry systems that require a certain level of security or personal identification may also use CLI to their advantage. The origin of the telephone call as given by the CLI may be used to extract from a store the identity of a number of individuals known to the system to be related to this origin. This store may also contain representative speech which is already verified to have come from these individuals. If there is only one individual authorised to access the given service from the designated origin, or the caller has made a specific claim to identity by means of additional information (e.g. a DTMF or spoken personal identification number) then a spoken utterance may be gathered from the caller and compared with the stored speech patterns associated with that claimed identity in order to verify that the person is who they say that they are. Alternatively, if there are a number of individuals associated with the call origin, the identity of the caller may be determined by gathering a spoken utterance from the caller and comparing it with stored speech patterns for each of the individuals in turn, selecting the most likely candidate that matches with a certain degree of confidence.

The CLI may also be used to access a store relating speech recognition models to the origin of the call. These speech models may then be loaded into the stores used by the speech recogniser. Thus, a call originating from a cellular telephone, for example, may be dealt with using speech recognition models trained using cellular speech data. A similar benefit may be derived for regional accents or different languages in a speech recognition system.

What is claimed is:

1. A speech recognition apparatus comprising:
   a store of data containing entries to be identified and information defining for each entry a connection with a word of a first set of words and a connection with a word of a second set of words:
   speech recognition means; and
   control means operable:
   (a) to control the speech recognition means to identify, by reference to recognition information for the first set of words, as many words of the first set as meet a predetermined criterion of similarity to first received voice signals;
   (b) upon such identification, to compile a list of all words of the second set which are connected with entries connected also with the identified word(s) of the first set; and
   (c) to control the speech recognition means as to identify, by reference to recognition information for the second set of words, at least one word of the list which resembles second received voice signals.

2. A speech recognition apparatus as in claim 1, in which:
   the speech recognition means is operable upon receipt of the first voice signal to generate for each identified word a measure of similarity with the first voice signal, and
   the control means is operable to generate for each word of the list a measure obtained from the measures for the relevant words of the first set, and
   the speech recognition means is operable upon receipt of the second voice signal to perform the identification of one or more words of the list in accordance with a recognition process weighted in dependence on the measures generated for the words of the list.

3. A speech recognition apparatus as in claim 2 in which:
   the control means is operable to weight the measure for each word of the list by a factor dependent on the number of words of the second set which are connected with entries connected also with the relevant identified word of the first set.

4. A speech recognition apparatus as in claim 2 in which:
   the control means is operable to omit from the list those words of the second set having a measure below a predetermined threshold.

5. A speech recognition apparatus as in claim 1 in which:
   the apparatus includes a store containing recognition data for all words of the second set, and
   the control means is operable following the compilation of the list and before recognition of the words, of the list, to mark in the recognition data store those items of data therein which correspond to the words not in the list or those which correspond to words which are in the list,
   whereby the recognition means may ignore all words so marked or, respectively, not marked.

6. A speech recognition apparatus as in claim 1 in which:
   the control means is operable following the compilation of the list to generate recognition data for each word of the list.

7. A speech recognition apparatus as in claim 1 in which:
   the control means is operable to select for output entries defined as connected both with an identified word of the first set and an identified word of the second set.

8. A speech recognition apparatus as in claim 1 in which:
   the store of data also contains information defining for each entry a connection with a word of a third set of words, and
   the control means is operable:
   (d) to compile a list of all words of the third set which are connected with entries also connected both with an identified word of the first set and an identified word of the second set; and
   (e) to control the speech recognition means to identify, by reference to recognition information for the third set of words, at least one word of the list which resembles third received voice signals.

9. A speech recognition apparatus as in claim 1 including:
   means to store at least one of the received voice signals, the apparatus being arranged to perform an additional recognition process in which the control means is operable:
   (a) to control the speech recognition means to identify, by reference to recognition information for one set of words, a plurality of words of that set which meet a predetermined criterion of similarity to the respective received voice signals;
   (b) to compile an additional list of all words of another set which are connected with entries connected also with the identified words of the one set; and
   (c) to control the speech recognition means to identify, by reference to recognition information for the other set of words, at least one word of the said additional list which resembles the respective received voice signals.

10. A speech recognition apparatus as in claim 9 including:
    means to recognise a failure condition and to initiate the said additional recognition process only in the event of such failure being recognised.

11. A speech recognition apparatus as in claim 1 further comprising:
    a telephone line connection; and
    means responsive to receipt via the telephone line connection of signals indicating the origin or destination of a telephone call to access stored information identifying a subset of at least one of the said sets of words and to restrict to that subset the operation of the speech recognition means for that set.

12. A telephone information apparatus comprising:
    a telephone line connection;
    a speech recogniser for recognising spoken words received via the telephone line connection, by reference to recognition data representing a set of possible utterances; and
    means responsive to receipt via the telephone line connection of signals indicating the origin or destination of a telephone call to access stored information identifying a subset of the set of utterances and to restrict the recogniser operation to that subset.

13. Apparatus as in claim 12, in which the apparatus includes:
   a store containing recognition data for all words of the sets, and
   the control means is operable to mark in the recognition data store those items of data therein which correspond to the words not in the subset or those which correspond to words which are in the subset,
   whereby the recognition means may ignore all words so marked or, respectively, not marked.

14. Apparatus as in claim 12, in which: the control means is operable to generate recognition data for each word of the subset.

15. A telephone apparatus comprising:
   a telephone line connection;
   a speech recogniser for determining or verifying the identity of the speaker of spoken words received via the telephone line connection, by reference to recognition data corresponding to a set of possible speakers; and
   means responsive to receipt via the telephone line connection of signals indicating the origin or destination of a telephone call to access stored information identifying a subset of the set of speakers and to restrict the recogniser operation to that subset.

16. A telephone information apparatus comprising:
   telephone line connection;
   a speech recogniser for recognising spoken words received via the telephone line connection, by reference to one of a plurality of stored sets of recognition data; and
   means responsive to receipt via the telephone line connection of signals indicating the original or destination of a telephone call to access stored information identifying one of the sets of recognition data and to supply this set to the recogniser.

17. A telephone information apparatus as in claim 16 in which the stored sets correspond to different languages or regional accents.

18. A telephone information apparatus as in claim 16 in which at least two of the sets correspond to the characteristics of different types of telephone apparatus.

19. A telephone information apparatus as in claim 18 in which one of the sets corresponds to the characteristics of a mobile telephone channel.

20. A speech recognition apparatus comprising:
   a store defining a first set of words;
   a store defining a second set of words;
   a store containing entries to be identified;
   a store containing information relating each entry to a word of the first set and to a word of the second set;
   speech recognition means operable upon receipt of a first voice signal to identify as many words of the first set as meet a predetermined recognition criterion;
   means to generate a list of all words of the second set which are related to an entry to which the identified word(s) of the first set is also related; and
   speech recognition means operable upon receipt of a second voice signal to identify at least one word of the list.

21. A recognition apparatus comprising:
   a store defining a first set of patterns;
   a store defining a second set of patterns;
   a store containing entries to be identified;
   a store containing information relating each entry to a pattern of the first set and to a pattern of the second set;
   recognition means operable upon receipt of a first input pattern signal to identify as many patterns of the first set as meet a predetermined recognition criterion;
   means to generate a list of all patterns of the second set which are related to an entry to which an identified pattern of the first set is also related; and
   recognition means operable upon receipt of a second input pattern signal to identify at least one pattern of the list.

22. A speech recognition apparatus comprising:
   (i) a store of data containing entries to be identified and information defining for each entry a connection with a signal of a first set of signals and a connection with a word of a second set of words;
   (ii) means for identifying a received signal as corresponding to as many of the first set as meet a predetermined criterion;
   (iii) control means operable to compile a list of all words of the second set which are connected with entries connected also with the identified signal of the first set; and
   (iv) speech recognition means operable to identify, by reference to recognition information for the second set of words, at least one word of the list which resembles received voice signals.

23. A speech recognition apparatus as in claim 22 in which:
   the first set of signals are voice signals representing spelled versions of the words of the second set or portions thereof, and
   the identifying means includes the speech recognition means operating by reference to recognition information for the said spelled voice signals.

24. A speech recognition apparatus as in claim 22 in which:
   the first set of signals are signals consisting of tones and the identifying means is a tone recogniser.

25. A speech recognition apparatus as in claim 22 in which:
   the first set of signals are signals indicating the origin or destination of the received signal.

26. A method of identifying entries in a store of data by reference to stored information defining connections between entries and words, said method comprising:
   (a) identifying one or more of the said words as present in received voice signals;
   (c) compiling a list of those of the said words connected with entries connected also with the identified words; and
   (c) identifying at least one of the words of the list as present in the received voice signals.

27. A speech recognition apparatus comprising:
   a) a store of data containing entries to be identified and information defining for each entry a connection with at least two words;
   b) a speech recognition means able to identify by reference to stored recognition information for a defined set of words, at least one word or word sequence which meets some predefined criterion of similarity to a received voice signal;
   (c) a control means operable:
      i) to compile a list of words which are connected with entries connected with a word previously identified by the speech recognition means; and
      ii) to control the speech recognition means to identify, by reference to recognition information for the compiled lists, at least one word or word sequence which resembles a further received voice signal.

28. A method of speech recognition by reference to a stored set of words to be recognised, said method comprising (a) receiving a speech signal;

(b) storing the speech signal;

(c) receiving a second signal;

(d) compiling a list of words, being a subset of the set of words, as a function of the second signal;

(e) applying to the stored speech signal a speech recognition process so as to identify, by reference to the list at least one word of the subset.

29. A method as in claim 28 in which the second signal is also a speech signal.

30. A method as in claim 29 including the step of: recognising the second signal by reference to recognition data representing a letter or sequence of letters of the alphabet.

31. A method as in claim 28 in which the second signal is a signal consisting of tones generated by a keypad.

32. A method as in claim 28 in which the second signal indicates the origin or destination of the second signal.

33. A method of speech recognition comprising:

(a) receiving a speech signal;

(b) storing the speech signal;

(c) performing a recognition operation on the speech signal or some other signal; and (d) in the event of the recognition operation failing to meet a predetermined criterion of reliability, retrieving the stored speech signal and performing a recognition operation thereon.

34. An interactive voice recognition and response method for identifying at least one stored data base item comprising plural classes of mutually inter-related sub-items, said method comprising:

(a) issuing a synthesized voice request for a first speech input representing a first class of sub-item;

(b) performing speech recognition of said first speech input to identify at least one potentially corresponding first sub-item;

(c) issuing a synthesized voice request for a second speech input representing a second class of sub-item;

(d) compiling a list of second sub-items mutually inter-related with said identified first sub-item(s); and (e) performing speech recognition of said second speech input with respect to said compiled list to identify at least one potentially corresponding second sub-item from said list.

35. A method as in claim 34 wherein steps c and d are at least in part concurrently performed.

36. A method as in claim 34 wherein the speech recognition of step b is performed with respect to a sub-set of the first class of sub-items.

37. A method as in claim 36 wherein said sub-set is chosen based on an identified origin or destination location of said first speech input.

* * * * *